Inventors
Joseph C. Wellington, Jr.
Stephen H. Fairweather
Fred H. Guth

United States Patent Office 2,795,747
Patented June 11, 1957

2,795,747

AUTOMATIC SPEED AND STABILIZING CONTROL USING VARIABLE TRANSMISSION

Joseph C. Wellington, Jr., Euclid, Stephen H. Fairweather, South Euclid, and Fred H. Guth, Maple Heights, Ohio, assignors to Thompson Products, Inc., Cleveland, Ohio, a corporation of Ohio Application July 16, 1952, Serial No. 299,101

15 Claims. (Cl. 318—13)

The automatic control apparatus of this invention has general application but, for the purpose of illustration, is described and shown herein as automatically controlling the velocity and phase of rotation of a load shaft in accordance with the rotation of a reference shaft. According to a preferred embodiment, an alternating current motor having a generally fixed speed and a pair of variable speed direct current motors are connected through differential gearing to the load shaft. The differential gearing is such that when the direct current motors are driven at the same speed, the load shaft is driven at a speed which is a fixed ratio of the speed of the alternating current motor and, by changing the relative speeds of the direct current motors, the speed of the load shaft is correspondingly changed. Since the motors are all constantly rotating and no start and stop operation is required, an extremely fast response is achieved.

In a preferred arrangement for controlling the velocity and phase of rotation of the load shaft is accordance with rotation of the reference shaft, a synchro generator is driven by the load shaft and is electrically connected to a synchro transformer driven by the reference shaft. The synchro transformer has an output corresponding in amplitude and phase to any difference in phase between the load shaft and the reference shaft. This output is applied to a control amplifier which controls the energization of the fields of the two direct current motors. When the synchro transformer output is of one phase, one motor will be driven at increased speed with the other motor at a decreased speed to increase the speed of the load shaft while, with the opposite phase, the reverse will be true. In this manner, the velocity of rotation of the load shaft is automatically maintained equal to the velocity of the reference shaft and, at any given speed, the relative phase between the two shafts is substantially constant. Hence, this drive maintains the rotational velocity of the load shaft to within very close tolerances equal to the velocity of rotation of the reference shaft.

Although the control amplifier may take other forms, a pair of gas-filled electronic tubes, or Thyratrons, are used with the plate excitation thereof being alternating current derived from the same line as the alternating current applied to the synchro generator. The output of the synchro transformer is applied between the grids of the two gas-filled tubes so that, with one phase, one tube will conduct more than the other and with the opposite phase, the other tube will conduct more than the one. The fields of the two direct-current motors are connected in the plate circuits of the Thyratron tubes.

Using apparatus such as thus far described, it was found that the control loop had a tendency to become unstable and oscillatory at a given frequency. According to an important feature of this invention, means are provided for rendering the control stable and non-oscillatory. In a preferred arrangement, a pair of small direct-current generators are driven by the load shaft and have direct-current outputs generally proportional to the velocity of rotation of the load shaft. The outputs of the generators are each connected to a resistor and a capacitor in series. With a constant velocity of rotation of the load shaft, the voltage output of the D.-C. generators will be constant and will appear entirely across the capacitors with no voltage across the resistors. However, with any change in the velocity of rotation of the load shaft, the output of the generators will be correspondingly changed, and a voltage will be developed across the resistors. These voltages developed across the resistors are applied to the grids of the two gas-filled electronic tubes and are of such polarity as to provide a negative feed back over a range of intermediate frequencies including the frequency at which the control would normally tend to oscillate, hence, stabilizing of the control apparatus by preventing oscillations.

In accordance with other features of this invention, the control apparatus as well as being extremely fast in response and stable in operation, can be very rugged and compact, easy and not critical to adjust and readily and economically manufacturable from the minimum number of component parts.

Accordingly, it is an object of this invention to provide compact and rugged automatic control apparatus which is extremely fast in response, very stable in operation, easy to adjust and readily and economically manufacturable from a minimum number of parts.

Other objects, features and advantages of the present invention will become more fully apparent from the following detailed description taken in conjunction with the accompanying drawings which illustrate a preferred embodiment and in which:

Figure 3 is a graph illustrating a response characteristic obtained with and without stabilizing means of this invention.

Figure 1:
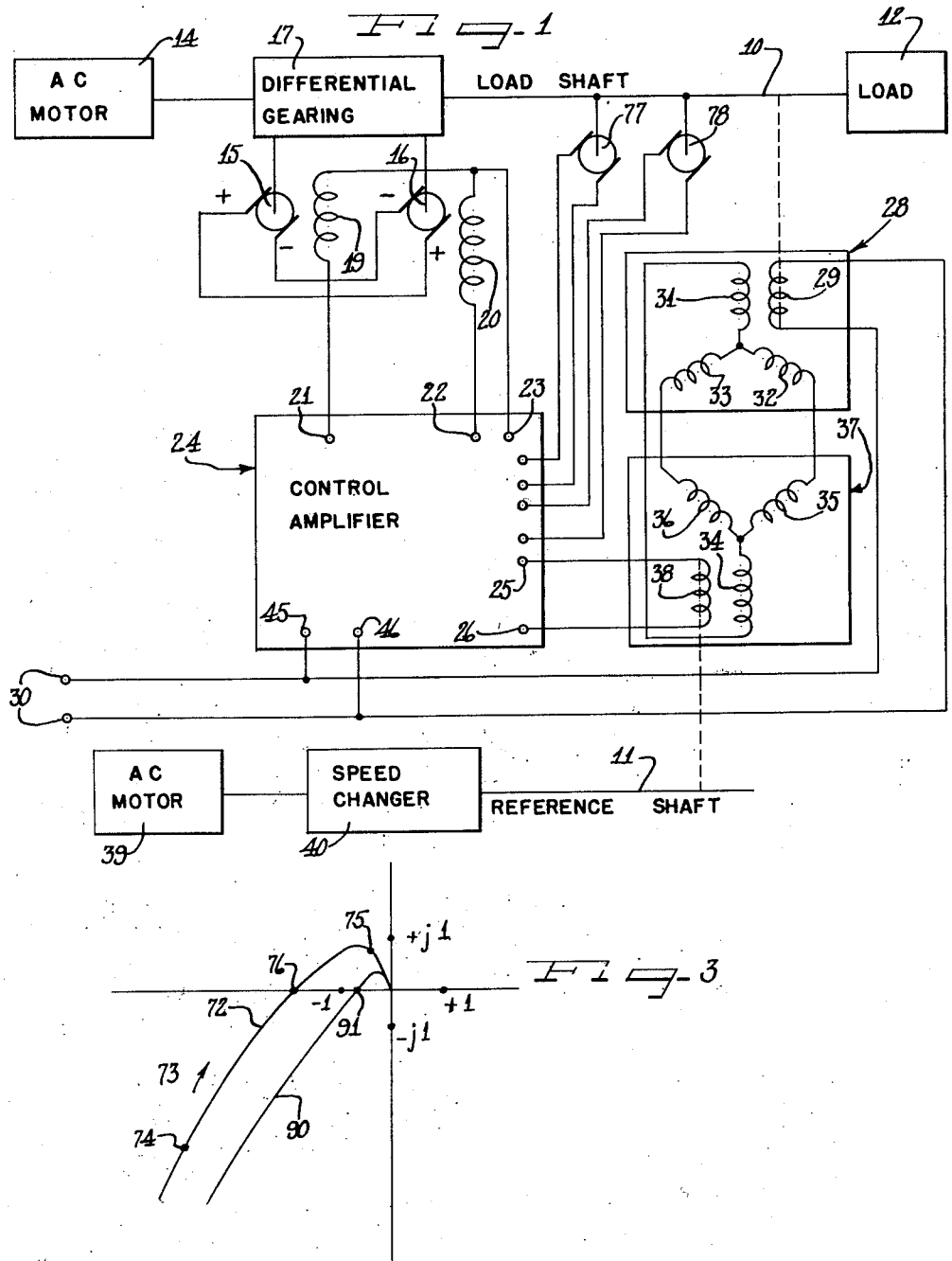
Figure 1 is a schematic diagram of control apparatus according to this invention.

The control apparatus of this invention has general application but is herein illustrated and described as used to control the velocity and phase of rotation of a load shaft 10, Figure 1, in relation to the velocity and phase of rotation of a reference shaft 11.

The load shaft 10 is connected to a load 12 and is driven by a variable speed drive including an alternating current motor 14 and a pair of direct-current motors 15 and 16 connected to the load shaft through differential gearing 17. The drive connection through the differential gearing 17 is such that there is a difference in speed between the load shaft 10 and the A.-C. motor 14 corresponding in amplitude and phase to any difference in speed between the motor 15 and the motor 16. For illustration, it will herein be assumed that with increased speed of the motor 15 relative to the motor 16, the speed of the load shaft 10 will be increased relative to motor 14.

The armatures of the motors 15 and 16 are connected in parallel with terminals of the same polarity connected together as indicated. To control the relative speeds of the direct-current motors 15 and 16, fields 19 and 20 respectively thereof are connected to output terminals 21, 22 and 23 of a control amplifier 24 which has a pair of input terminals 25 and 26 excited by an error or correction voltage arising from any difference in phase between the load shaft 10 and the reference shaft 11. With an error voltage of one phase, motor 15 will be driven faster than the motor 16 and, with the reverse phase, motor 15 will be driven slower than motor 16 so that the speed of the load shaft 10 with respect to the reference shaft 11 is automatically maintained constant.

The error voltage may be obtained in any desired manner, a preferred way being illustrated in Figure 1 in which a synchro generator 28 has a rotor 29 excited from a source of alternating current applied to terminals 30, the rotor 29 being driven by the load shaft 10 with respect to three equally spaced stator windings 31, 32 and 33 which are connected to similar stator windings 34, 35 and 36, respectively, of a synchro transformer 37. This transformer 37 has a rotor 38 mechanically driven by the reference shaft and electrically connected to the input terminals 25 and 26 of the control amplifier 24. When the reference shaft and load shaft are driven at the same speed and in phase, there will be no error voltage developed in the rotor 38. With any phase difference between the two shafts, an error or correction voltage will be developed across the rotor 38. This error voltage is alternating and of one phase when shaft 10 leads shaft 11 and 180° out of said one phase when the shaft 10 lags shaft 11. The amplitude, of course, is dependent upon the angle of lead or lag.

It may be here noted that the reference shaft 11 may be any shaft which it is desired to synchronize another shaft with. If desired, the shaft 11 may be driven by an alternating-current motor 39 through an adjustable speed changer 40 as illustrated in Figure 1.

Figure 2:
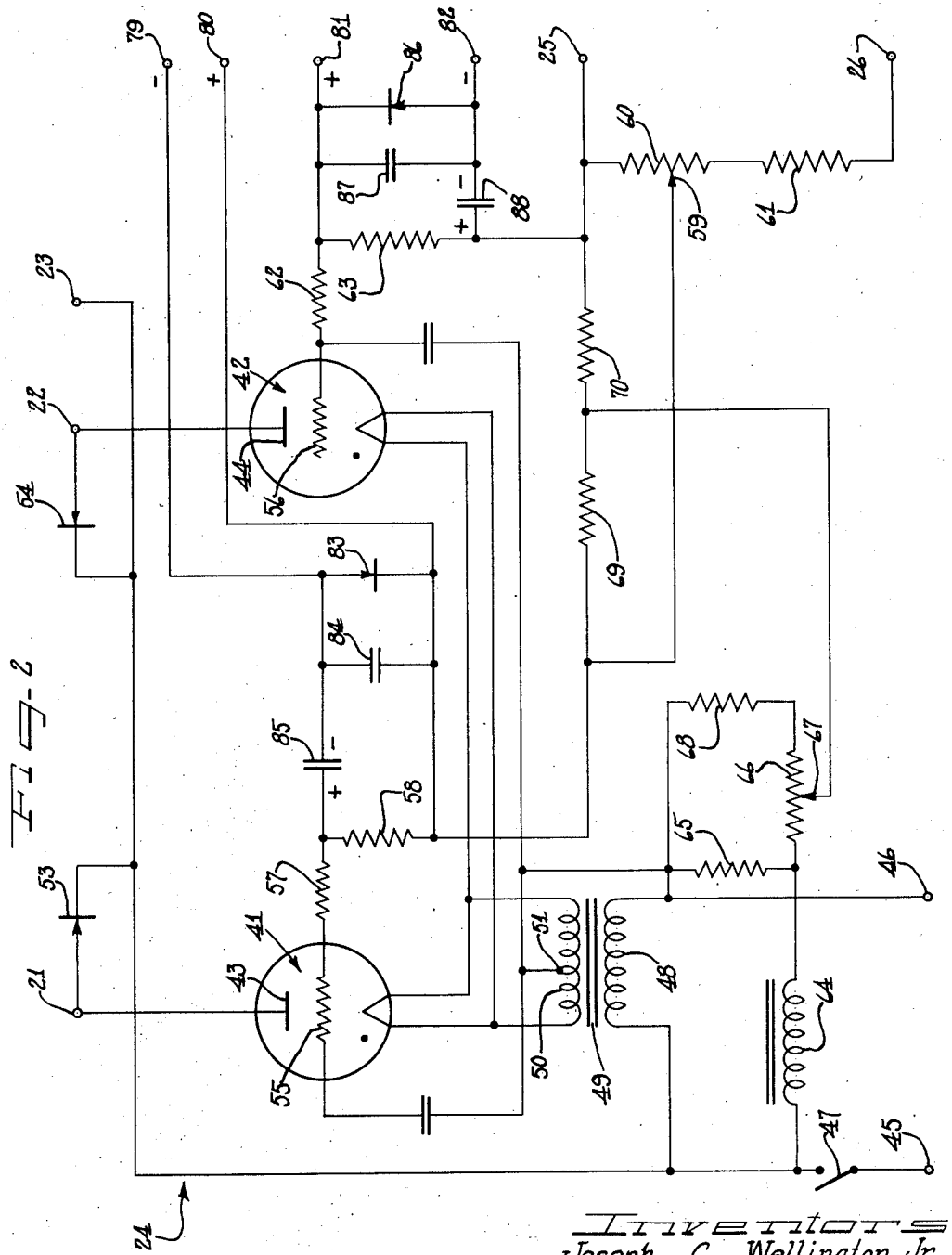
Figure 2 is a circuit diagram of the control amplifier of the apparatus of Figure 1.

Referring now to the circuit diagram of Figure 2, the control amplifier 24 includes a pair of gas-filled triode electronic tubes or Thyratrons 41 and 42 which has plates 43 and 44, respectively, connected to the terminals 21 and 22, respectively, which are, as described above, connected to the fields 19 and 20, respectively, of the motors 15 and 16. Power for the control amplifier 24 is supplied from the terminals 30 to terminals 45 and 46 of the control amplifier. This power is single phase alternating-current and is the same as that applied to the rotor 29 of the synchro generator 28. The terminal 45 is connected through a master switch 47 to one side of a primary 48 of a filament transformer 49 with the other side of the primary 48 connected to the terminal 46. The transformer 49 has a secondary 50 connected to the filaments of both tubes and having a center-tap 51 connected to the terminal 46. Plate voltage for the tubes 41 and 42 is supplied by connecting the terminal 45 through the switch 47 to the terminal 23 which is, as described above, connected to both of the fields of the motors 15 and 16. To absorb the energy stored in the fields 19 and 20 during the negative half cycles of alternating voltage applied to the tubes 41 and 42, rectifiers 53 and 54 are connected between the terminals 21 and 22, respectively, and the terminal 23 so as to be across the fields 19 and 20. During negative half cycles of plate voltage, the rectifiers will serve to continue current flow through the fields 19 and 20 hence, allowing a derating of the Thyratrons 41 and 42.

The tubes 41 and 42 have grids 55 and 56, respectively, the grid 55 being connected through resistors 57 and 58 to the arm 59 of a potentiometer 60 connected in series with a resistor 61 between the input terminals 25 and 26, while the grid 56 is connected through resistors 62 and 63 to the terminal 25. Hence, the error voltage applied to the terminals 25 and 26 is applied between the grids 55 and 56.

To provide bias for the tubes 41 and 42, and inductance 64 is connected in series with a resistor 65 from the load side of the switch 47 to the line terminal 46. A potentiometer 66 having a movable arm 67 and a resistor 68 are connected in series across the resistor 65, the arm 67 being connected to the junction between resistors 69 and 70 which are between the grids 55 and 56. The amount of bias may, of course, be controlled by the position of the arm 66 on the potentiometer 66.

With the circuit thus far described, if the shaft 10 should lead the reference shaft 11, an error voltage will be developed from the terminal 25 to the terminal 26 in phase with the voltage applied from terminal 46 to terminal 45 thus increasing the potential of grid 55 of tube 41 while decreasing the potential of grid 56 of tube 42. Thus, the current through field 19 will be increased and the current through field 20 decreased, the speed of the motor 15 will be decreased with the speed of the motor 16 increased and the load shaft will tend to decrease its speed to reduce the lead of the shaft 10 or the shaft 11.

An arrangement as thus far described was found to have a very fast response but had a tendency to be unstable. To test for unstability, the control loop was opened, for example, by removing the drive connection between load shaft 10 and rotor 29 of the synchro generator 28. A variable frequency input was then applied to the synchro transformer with the output at the differential gearing 17 being measured. Plotting the output-input relation vectorially with variable frequency, a curve as indicated by reference numeral 72 is Figure 3 was obtained, the frequency increasing in the direction of arrow 73, point 74 being at a relatively low frequency and point 75 being at a relatively high frequency. This curve was obtained without a 180° phase shift normally present in the control loop. Hence, at an intermediate frequency such as the point 76 on the real axis, and the output is in phase with the input and, with the loop closed, a regenerative effect is obtained. As shown, the point 76 is to the left of the $-1, j0$ point and, hence, an oscillatory loop is formed at this frequency, accounting for the instability of the control loop.

According to a particular feature of this invention, means are operable on the control amplifier 24 over an intermediate range of frequencies including the frequency 76 for rendering the control loop non-oscillatory and stable. This means herein includes a pair of small direct-current generators or tachometers 77 and 78 mechanically driven by the load shaft 10 and electrically connected to terminals 79—80 and 81—82, respectively, of the control amplifier 24.

The terminal 80 is positive relative to the terminal 79 as indicated in Figure 2 and these two terminals are connected to a smoothing filter including a rectifier 83 and a capacitor 84 and then through a capacitor 85 to the resistor 58 in the grid circuit of the Thyratron tube 41.

The terminal 82 is negative relative to the terminal 81 as indicated in Figure 2 and these two terminals are connected in a similar manner to a smoothing filter including a rectifier 86 and a capacitor 87 and then through a capacitor 88 to the resistor 63 in the grid circuit of tube 42.

With the load shaft 10 and the tachometers 77 and 78 operating at a constant speed, the capacitors 85 and 88 will be charged up through the resistors 58 and 63, respectively, as indicated and there will be no current flow through the resistors 58 and 63. However, if the speed of the load shaft and generators 77 and 78 should change, the capacitors 85 and 88 will either tend to charge up or discharge through the resistors 58 and 63, respectively, and there will be a current flow in the resistors thus changing the bias applied to the grids 55 and 56 of the Thyratron tubes 41 and 42, respectively. Hence, the capacitors 85 and 88 block flow of steady direct-current from the generators 77 and 78 in the resistors 58 and 63 but allow pulsating current to appear in the resistors.

The polarity of the voltages developed across resistors 58 and 63 as a result of changes in speed are such as to provide a negative feed back over an intermediate range of frequencies including the frequency at point 76, Figure 3, so as to eliminate oscillation and stabilize the control. Curve 90 in Figure 3 indicates the response with the feed back feature operative and it will be noted that this curve crosses the real axis at a point to the right of the $-1$ point hence preventing the possibility of regeneration and oscillation at any frequency.

This invention accordingly provides a compact and rugged automatic control apparatus which is extremely fast in response, very stable in operation, easy to adjust and readily and economically manufacturable from a minimum number of component parts.

It will be understood that modifications and variations may be effected without departing from the spirit and scope of the novel concepts of the present invention.

We claim as our invention:

1. In speed control apparatus including a load shaft and drive means for the load shaft, a control loop including control means having an electrical output varying in accordance with the velocity of rotation of the shaft and amplifier means responsive to said electrical output for controlling the drive means and the velocity of rotation of the shaft, and feed back means driven by the shaft and coupled into said amplifier means, said control loop being oscillatory at a given frequency, and said feed back means introducing a negative feed back into said amplifier over an intermediate range of frequencies including said given frequency to prevent oscillation and to stabilize the control apparatus.

2. In speed control apparatus including a load shaft and drive means for the load shaft, a control loop including control means having an electrical output varying in accordance with the velocity of rotation of the shaft and amplifier means responsive to said electrical output for controlling the drive means and the velocity of rotation of the shaft, said control loop being oscillatory at a given frequency, electrical generator means coupled to the load shaft and having a direct-current output generally proportional to the velocity of rotation of the shaft, circuit means including a resistor and a capacitor connected in series across said direct-current output, and means coupling the voltage developed across said resistor in response to variations in the velocity of rotation of the shaft into said amplifier for introducing a negative feed back over an intermediate range of frequencies including said given frequency to prevent oscillation and to stabilize the control apparatus.

3. In speed control apparatus including a load shaft and drive means for the load shaft, a control loop including control means having an electrical output varying in accordance with the velocity of rotation of the shaft and amplifier means responsive to said electrical output for controlling the drive means and the velocity of rotation of the shaft, said control loop being oscillatory at a given frequency, electrical generator means coupled to the load shaft and having a direct-current output generally proportional to the velocity of rotation of the shaft, circuit means including a resistor and a capacitor connected in series across said direct-current output, and means coupling the voltage developed across said resistor in response to variations in the velocity of rotation of the shaft into said amplifier, the product of the resistance of said resistor and the capacitance of said capacitor being comparable with the period of said given frequency for introducing a negative feed back over an intermediate range of frequencies including said given frequency to prevent oscillation and stabilize the control apparatus.

4. In speed control apparatus including a load shaft and drive means for the load shaft, a control loop comprising control means having an electrical output varying in accordance with the velocity of rotation of the shaft and amplifier means for controlling the drive means including a pair of electronic tubes each having a control element connected to said electrical output, said loop being oscillatory at a given frequency, and electrical generator means connected to the load shaft and coupled to said control elements for introducing a negative feed back over an intermediate range of frequencies including said given frequency to prevent oscillation and to stabilize the control apparatus.

5. In speed control apparatus including a load shaft and drive means for the load shaft, a control loop comprising control means having an electrical output varying in accordance with the velocity of rotation of the shaft and amplifier means for controlling the drive means including a pair of electronic tubes each having a control element connected to said electrical output, said loop being oscillatory at a given frequency, a pair of electrical generator means connected to the load shaft and each having a direct-current output generally proportional to the velocity of rotation of the shaft, circuit means including a resistor and a capacitor connected in series across each of said direct-current outputs, and means coupling the voltages developed across said resistors in response to variations in velocity of rotation of said shaft to said control elements for introducing a negative feed back over a range of frequencies including said given frequency to prevent oscillation and to stabilize the control apparatus.

6. Speed control apparatus including a load shaft, drive means for said load shaft, means for controlling the drive speed of said drive means, speed responsive means for controlling said drive speed controlling means, direct-current generating means driven by the load shaft and modifying the action of said drive speed controlling means for introducing negative feed back over an intermediate range of frequencies and preventing oscillation of the control apparatus.

7. Speed control apparatus including a load shaft, drive means for said load shaft, means for controlling the drive speed of said drive means, speed responsive means for controlling said drive speed controlling means, direct-current generating means driven by said load shaft, and a circuit excited by said generating means and including a resistor and a capacitor in series, the voltage developed across said resistor in response to variations in the speed of said load shaft being applied to said drive speed controlling means for introducing negative feed back over an intermediate range of frequencies and for preventing oscillation and stabilizing the control apparatus.

8. Speed control apparatus including a load shaft, drive means for said load shaft, means for controlling the drive speed of said drive means, a synchro generator having an alternating current output which is a function of load shaft speed and connected to said drive speed controlling means, and direct-current generating means driven by the load shaft and modifying the action of said drive speed controlling means for introducing negative feed back over an intermediate range of frequencies to prevent oscillation and stabilize the control apparatus.

9. Speed control apparatus including a load shaft, drive means for said load shaft, a pair of current responsive elements for controlling said drive means, the speed of the load shaft being a function of the current through one of said elements and an inverse function of the current through the other of said elements, a pair of alternating current-excited gas-filled electronic tubes for controlling current flow through said current responsive elements and each having a control electrode, a synchro generator and a synchro transformer having stators connected together and having rotors driven by said load shaft and at a reference speed, one rotor being excited by alternating current and the other being connected to said control electrodes, direct-current generating means driven by the load shaft, a circuit including a resistor and a capacitor in series across said generating means, the voltage developed across said resistor being applied to said control electrodes to introduce a negative feed back over an intermediate range of frequencies and to prevent oscillation and stabilize the control apparatus.

10. Speed control apparatus including a load shaft, drive means for said load shaft, means for controlling the drive speed of said drive means, a synchro generator and a synchro transformer having stators connected together and rotors driven at a reference speed and by said load shaft, one rotor being excited by alternating current and the other being connected to control said drive speed controlling means, and direct-current generating means driven by the load shaft and connected to introduce a negative feed back in said drive speed controlling means over an intermediate range of frequencies to prevent oscillation and to stabilize the control apparatus.

11. Speed control apparatus including a load shaft, drive means for said load shaft, means for controlling the drive speed of said drive means, a synchro generator and a synchro transformer having stators connected together and rotors driven at a reference speed by said load shaft, one rotor being excited by alternating current and the other being connected to control said drive speed controlling means, direct-current generating means driven by said load shaft, circuit means excited by said generating means and including a resistor and capacitor in series, the voltage developed across said resistor in response to variations in speed of the load shaft being applied to said drive speed controlling means for introducing negative feed back over an intermediate range of frequencies to prevent oscillation and stabilize the control apparatus.

12. Speed control apparatus including a load shaft, drive means for said load shaft, a current responsive element for controlling the drive speed of said drive means, an alternating current-excited gas-filled electronic tube for controlling current flow through said current responsive element and having a control electrode, means responsive to the speed of said load shaft and connected to said control electrode, and means driven by the load shaft and connected to said control electrode for introducing negative feed back over an intermediate range of frequencies to prevent oscillation and to stabilize the control apparatus.

13. Speed control apparatus including a load shaft, drive means for said load shaft, a current responsive element for controlling the drive speed of said drive means, an alternating-current excited gas-filled electronic tube for controlling current flow through said current responsive element and having a control electrode, means responsive to the speed of said load shaft and connected to said control electrode, direct-current generating means driven by said load shaft, circuit means excited by said generating means and including a resistor and a capacitor in series, the voltage developed across said resistor in response to variations in the drive speed of the load shaft being applied to said control electrode for introducing a negative feed back over an intermediate range of frequencies to prevent oscillation and to stabilize the control apparatus.

14. Speed control apparatus including a load shaft, drive means for said load shaft, a pair of current responsive elements for controlling the drive speed of said drive means, the speed of the load shaft being a function of the current through one of said elements and an inverse function of the current through the other, a pair of alternating-current excited gas-filled electronic tubes for controlling current flow through said current responsive elements and each having a control electrode, means responsive to the speed of said load shaft and connected to said control electrodes, and means driven by the load shaft and connected to said control electrodes for introducing a negative feed back over an intermediate range of frequencies to prevent oscillation and to stabilize the control apparatus.

15. Speed control apparatus including a load shaft, drive means for said load shaft, a pair of current responsive elements for controlling said drive means, the speed of the load shaft being a function of the current through one of said elements and an inverse function of the current through the other, a pair of alternating-current excited gas-filled electronic tubes for controlling current flow through said current responsive elements and each having a control electrode, means responsive to the speed of said load shaft and connected to said control electrodes, direct-current generating means driven by said load shaft, circuit means excited by said generating means and including a resistor and a capacitor in series, the voltage developed across said resistor being applied to said control electrodes for introducing negative feed back over an intermediate range of frequencies to prevent oscillation and stabilize the control apparatus.

References Cited in the file of this patent

UNITED STATES PATENTS

| | | |
|---|---|---|
| 1,617,991 | Dowey | Feb. 15, 1927 |
| 2,115,086 | Riggs | Apr. 26, 1938 |
| 2,411,745 | Moyer | Nov. 26, 1946 |